United States Patent

Brayer

[11] Patent Number: 5,116,119
[45] Date of Patent: May 26, 1992

[54] METHOD AND APPARATUS FOR MEASURING LIQUID FLOW
[75] Inventor: Eyal Brayer, Kfar Monash, Israel
[73] Assignee: S.C.R. Engineers Ltd., Natania, Israel
[21] Appl. No.: 771,903
[22] Filed: Oct. 4, 1991
[51] Int. Cl.⁵ ............................................. G01F 23/00
[52] U.S. Cl. ..................... 356/28; 356/436; 119/14.15; 73/861
[58] Field of Search ................ 356/28, 436, 440, 441, 356/442; 73/36, 861, 861.05, 861.08; 119/14.15, 14.16

[56] References Cited
U.S. PATENT DOCUMENTS 4,433,577  2/1984  Khurgin et al. ............... 73/290 V
4,543,834  10/1985  Hasegawa et al. ............ 73/861.05
4,925,296  5/1990  Reichmuth ..................... 356/28

Primary Examiner—Mark Hellner
Attorney, Agent, or Firm—Benjamin J. Barish

[57] ABSTRACT

A method and apparatus for measuring liquid flow, particularly milk, includes directing the liquid to flow through one or more flow channels, while exposing the liquid to electromagnetic radiation; measuring the transparency to electromagnetic radiation of the liquid flowing through the flow channel; and measuring the momentary attenuation of electromagnetic radiation by the liquid flowing through the flow channels, to determine the momentary volume of the liquid flowing through the flow channel. The momentary velocity of the liquid flowing through the flow channels is also determined, thereby permitting a determination of the momentary flow rate of the liquid flowing through the flow channels.

20 Claims, 3 Drawing Sheets

METHOD AND APPARATUS FOR MEASURING LIQUID FLOW

FIELD AND BACKGROUND OF THE INVENTION

The present invention relates to a method and apparatus for measuring liquid flow. The invention is particularly useful for measuring the flow of milk, and is therefore described below particularly with respect to this application, but it will be appreciated that the invention could advantageously be used for measuring the flow of other liquids, particularly mixtures.

Existing methods of measuring milk flow are generally based on mechanical type measuring devices. One way of electrically measuring milk flow is to subject the milk to electromagnetic radiation and to measure the attenuation of the electromagnetic radiation by the milk. However, the composition of the milk varies substantially from cow to cow, and even from the same cow during the same milking process. Such variations in composition affect the attenuation of the electromagnetic radiation by the milk and thereby affect the measurements in a significant manner.

OBJECTS AND BRIEF SUMMARY OF THE INVENTION

An object of the present invention is to provide a method, and also an apparatus, for measuring liquid flow in which variations in the composition of the liquid do no significantly affect the measurements. Another object of the present invention is to provide a method and apparatus which not only produces a relatively accurate measurement, in real time, of the flow of a liquid despite variations in the liquid composition, but which also provides additional information useful in indicating the composition of the liquid whose flow rate is being measured. A further object is to provide a method and apparatus of measuring milk flow particularly useful for accurately measuring flow rates of milk in a real time manner.

According to one aspect of the present invention, there is provided a method of measuring liquid flow, comprising the steps: (a) directing the liquid to flow through a flow channel of known dimensions while exposing the liquid to electromagnetic radiation; (b) measuring the momentary attenuation of the elecromagnetic radiation by the liquid flowing through the flow channel; (c) measuring the relative transparency to electromagnetic radiation of the liquid flowing through the flow channel for calibration purposes; (d) determining from the foregoing measurements the momentary volume of the liquid flowing through the flow channel; (e) determining the momentary velocity of the liquid flowing through the flow channel; and (f) determining from steps (d) and (e) the momentary flow rate of the liquid flowing through the flow channel.

According to further features in the preferred embodiment of the invention described below, the transparency is measured by subjecting a known volume of the liquid to the electromagnetic radiation and measuring its attentuation. More particularly, the transparency of the liquid is measured by measuring the attenuation by the liquid of the electromagnetic radiation while the liquid flows through and fills a conduit of known dimensions.

In the described embodiment, the latter channel is a calibrating channel separate from the flow channel. It is contemplated, however, that the flow channel, or one of the flow channels (if a plurality are provided), could also be used as the calibrating channel if the transparency measurement is taken when that channel is full.

The preferred embodiment of the invention described below provides further important features, including the following: in step (a), the liquid is directed to flow through a plurality of the flow channels in parallel to each other; in step (b), the momentary attenuation of the electromagnetic radiation is measured in each of the plurality of flow channels; and in step (d), the momentary volume of the liquid flowing through all the flow channels is measured to determine the momentary volume of the liquid flowing through all the flow channels.

According to still further features in the described preferred embodiment, in step (b) the momentary attenuation of the electromagnetic radiation measured in at least some of the flow channels is of different frequencies, to thereby provide information useful in indicating the composition of the liquid flowing through the flow channels.

In the preferred embodiment of the invention described below, the electromagnetic radiation source is a source of infrared light.

As will be described more particularly below, the method of the present invention is particularly useful for measuring the flow rate of milk since the results are not significantly affected by changes in composition of the milk from cow to cow, or even from the same cow. Moreover, the results produced by the method also provide information useful in indicating the actual composition of the milk whose flow rate is being measured. Thus, the latter feature makes it possible to estimate the milk's different components, such as relative percentages of fat and protein, since these relative percentages influence the absorption of the light from the light source.

The invention also provides apparatus for measuring liquid flow in accordance with the above method.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
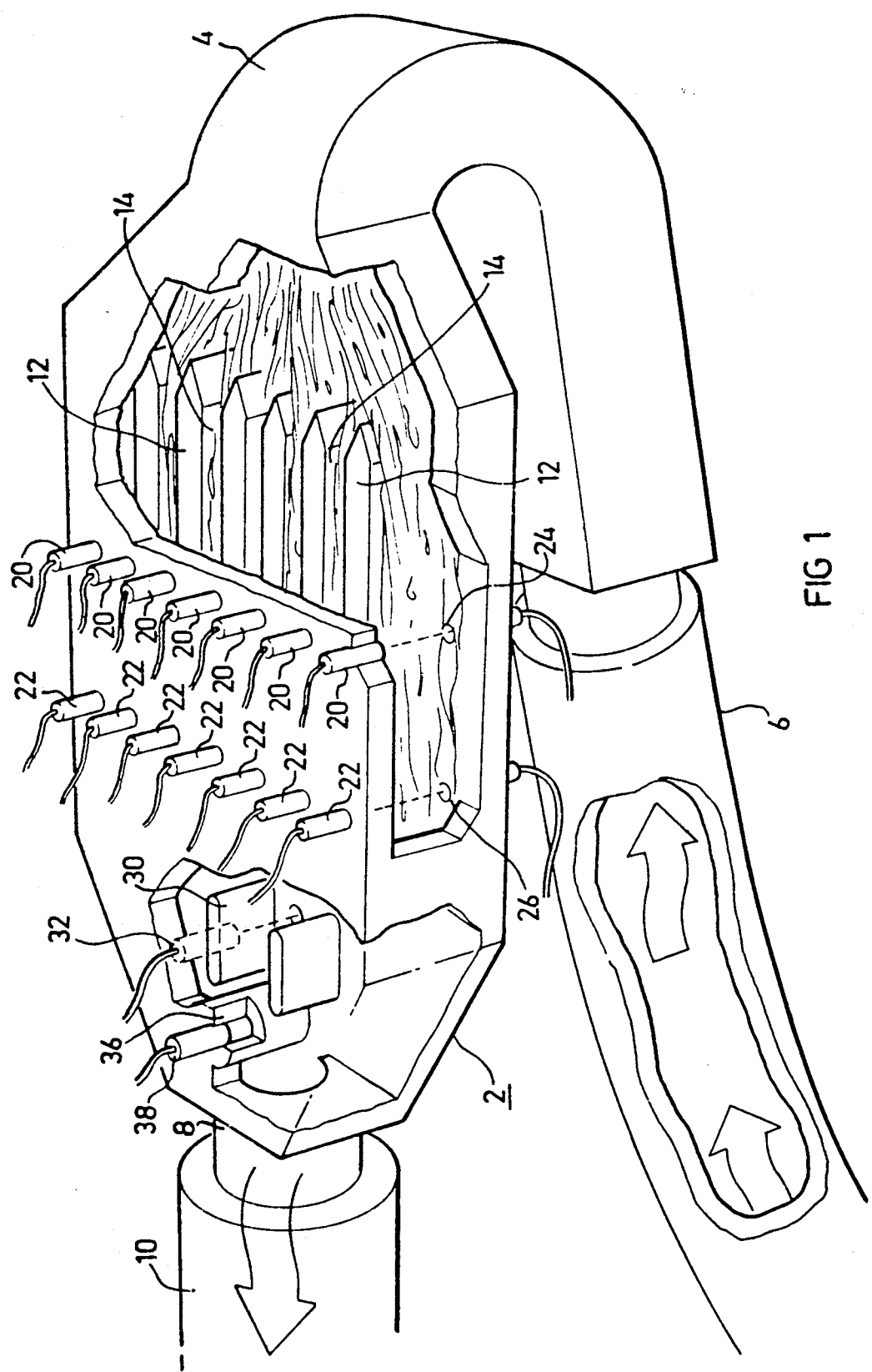
FIG. 1 illustrates one form of measuring apparatus constructed in accordance with the present invention.

The apparatus illustrated in the drawings is particularly useful for measuring the flow rate of milk and also for indicating its composition, e.g., the relative percentages of fat and protein.

The apparatus illustrated in FIG. 1 includes a measuring head, generally designated 2, having an inlet 4 connected to a conduit 6 leading from a source of the milk (e.g., a cow milking machine), and an outlet 8 connected to an outlet conduit 10 (e.g., leading to a container for receiving the milk). As the milk flows through measuring head 2, its flow rate is continuously measured in a real time manner despite variations in the composition of the milk.

The outlet conduit 10 would normally be connected to a vacuum source. Thus, when the flow of milk through the measuring head 2 is not continuous, air "bubbles", or milk "pulses", would be produced in the flow of the milk through the measuring head.

Measuring head 2 includes, adjacent to its inlet end 4, a plurality of partitions 12 which divide the inflowing milk into a plurality of parallel flow channels 14. Each of the flow channels 14 is of known dimensions, in that both its width and height are known. However, the flow channels 14 are designed, as compared to the range of flow rate of the milk to be measured, so that the channels are not completely filled by the milk at the time the measurements are made. Accordingly, the volume of each channel will vary in accordance with the flow rate of the milk through that channel.

Measuring head 2 further includes two lines of electromagnetic radiation sources, such as infrared light sources, each aligned with, and on one side of, each of the flow channels 14. In the example illustrated in FIG. 1, there are seven flow channels 14, and therefore there is a first line of seven light sources 20, and a second line of seven light sources 22 spaced from line 20 towards the outlet end 8 of the housing. The distance between the two lines of light sources 20, 22 is precisely known. This enables a determination of the velocity of the milk flow to be made, as will be described more particularly below. Each of the light sources 20, 22 is aligned with a light detector 24, 26, at the opposite side of the respective channel 14, so that each detector 24, 26 measures the attenuation of the light produced by the milk passing through the respective channel 14.

Measuring head 2 includes a further channel 30, serving as a calibrating channel, through which the milk is directed after it leaves the seven flow channels 14. Calibrating channel 30 is also of known dimensions, but in this case the channel is completely filled with milk when measurements are taken, as distinguished from the flow channels 14 which may not be completely filled with milk during the normal working ranges of the illustrated apparatus. Calibrating channel 30 is used for measuring the relative transparency of the milk. For this purpose, the calibration channel 30 is also equipped with a light source 32 and a detector 34 on the opposite sides of the channel.

The milk, after passing through calibration channel 30, passes through another calibration station 36 between the calibration channel 30 and the housing outlet 8. Calibration station 36 is also equipped with a light source 38 and detector (40, FIG. 2). The light source 38 and its corresponding detector 40 are subjected to the same temperature as the milk flowing through channels 14 and 30, but they are physically insulated from the milk so that the detected radiation is influenced, not by the attenuation of the radiation caused by the milk, but only by the temperature variations of the milk.

Figure 2:
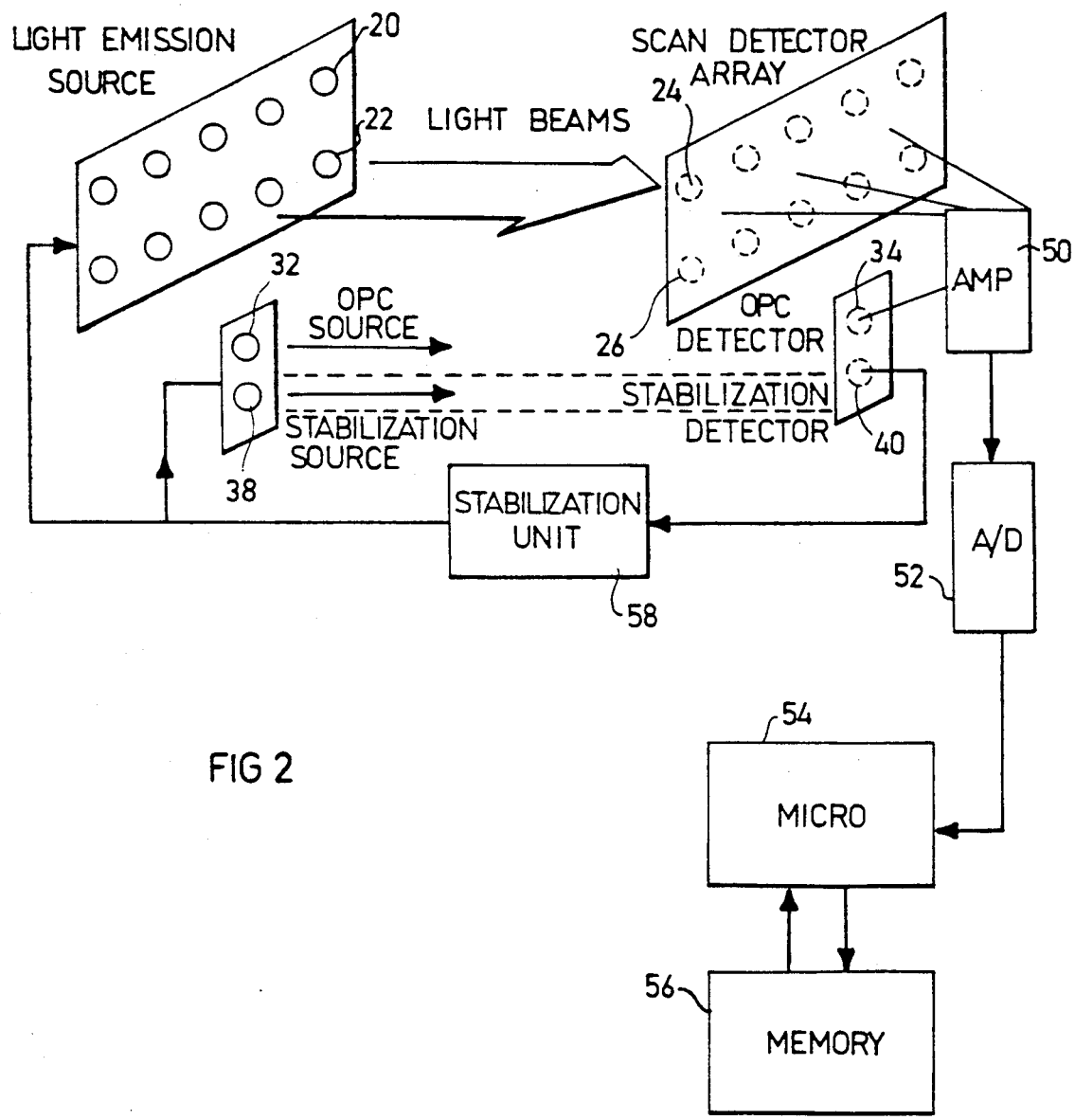
FIG. 2 is a block diagram of a system including the apparatus of FIG. 1.

The overall system including the measuring head 2 illustrated in FIG. 1, is more particularly illustrated in the block diagram of FIG. 2. It will thus be seen that the radiation from the line of light sources 20 passes through the milk flowing through the flow channels 14, so that the radiation detected by each of the detectors 24 at the opposite side of reach channel provides an indication of the momentary attenuation produced by the milk flowing through the respective channel. A similar measurement is provided by the second line of light sources 22 and their respective detectors 26. Since the distance between the two lines of light sources is known, the velocity of the milk flowing through the flow channels 14 can be determined.

Figure 3:
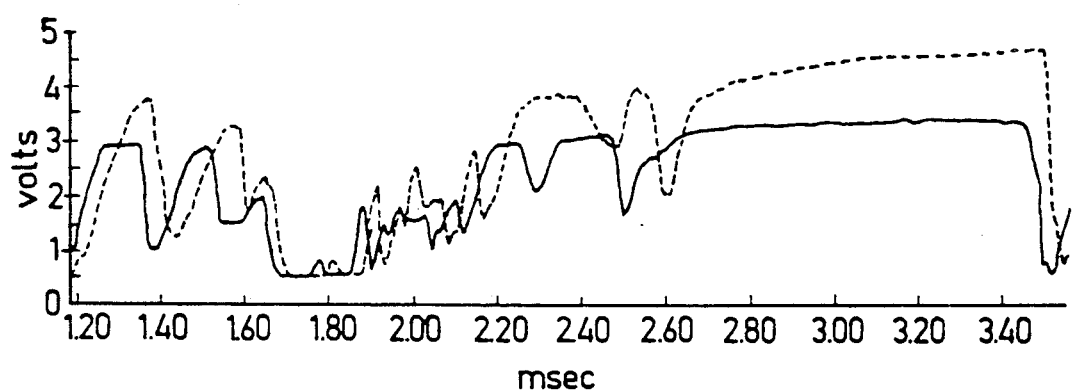
FIG. 3 are waveforms helpful in understanding the method and apparatus of the present invention.

This is more particularly illustrated in FIG. 3, wherein it will be seen that the broken-line waveform, corresponding to the outputs of detectors 26 cooperable with the line of light sources 22 lags the full-line waveform, correspond to the outputs of detectors 24 cooperable with the line of light sources 20 because of the distance between the two lines of light sources and detectors. Since this distance is known, and since this lag can be measured, the velocity of the milk flowing through the flow channels 14 can be determined.

The outputs of the two groups of detectors 24, 26 are fed, via an amplifier 50 and an analog-to-digital converter 52, to a microprocessor 54 which makes this determination.

Detector 34, aligned with light source 32 in the calibration channel 30, also produces an output which is applied, via amplifier 50 and converter 52, to the microprocessor 54. As described earlier, since the calibration channel 30 is always full of milk, the output of its detector 34 will not provide an indication of the relative volume of the channel occupied by the milk, but rather of the relative transparency of the milk flowing through that channel. Thus, the higher the percentage of fat in the milk, the lower will be the relative transparency of the milk to the radiation, and therefore the higher will be the attentuation resulting from the passage of the radiation through the milk.

Microprocessor 54 receives the outputs from the two groups of detectors 24, 26, and also from the calibration detector 34. Microprocessor 54 includes a non-volatile memory 56 that contains a table for converting the measurements of detectors 24, 26, and also of a calibration detector 34, to the relative volume of the flow channels 14 occupied by the milk passing through these channels. Since microprocessor 54 also determines (from the two lines of detectors 24, 26) the velocity of the milk passing through these channels, the microprocessor is able to determine the flow rate of the milk at any instant irrespective of its transparency.

The amount of light absorbed by the milk flowing through the flow channels 14 is dependent, not only on the relative volume of the milk actually occupying the respective channel and the composition (transparency) of the milk in the channel, but also on the frequency of the radiation of its respective source (20, 22). Thus, the light sources 20 and their detectors 24 in some or all of the channels could be selected to operate at different frequencies, so that the information received by their respective detectors 24 will provide an indication of the relative composition of the milk then being measured, e.g., the relative percentage of fat and protein.

Detector 40 feeds it output, which varies with the temperature, to a stabilization unit 58. This unit controls the energy supplied to all the light sources 20, 22, 32 and 38, in order to compensate the measurements for changes in temperature and ageing effects.

In order to obtain a precision of ± one percent, which is generally more than adequate for the consumer, it is possible to use low sample rates, in the region of 3-30 Khz, and a data word width of eight bits. These sample rates and data widths enable the use of standard low cost analog-to-digital components and microprocessors. The radiation sources and detectors may change by ageing. Ageing can be measured by examining the values obtained in the receivers while the channels are empty, and may also be compensated for by updating the table stored in the memory 56.

While the invention has been described with respect to one preferred embodiment, it will be appreciated that many variations and other applications of the invention may be made.

What is claimed is:

1. A method of measuring liquid flow, comprising the steps:
   (a) directing the liquid to flow through a flow channel of known dimensions while exposing the liquid to electromagnetic radiation;
   (b) measuring the momentary attenuation of the electromagnetic radiation by the liquid flowing through said flow channel;
   (c) measuring the relative transparency to electromagnetic radiation of the liquid flowing through said flow channel for calibration purposes;
   (d) determining from said measurements the momentary volume of said liquid flowing through said flow channel;
   (e) determining the velocity of the liquid flowing through said flow channel; and
   (f) determining from said steps (d) and (e) the momentary flow rate of the liquid flowing through said flow channel.

2. The method according to claim 1, wherein said transparency is measured by subjecting a known volume of the liquid to said electromagnetic radiation and measuring the attenuation thereof.

3. The method according to claim 2, wherein said transparency of the liquid is measured by measuring the attenuation by the liquid of said electromagnetic radiation while the liquid flows through and fills a conduit of known dimensions.

4. The method according to claim 3, wherein said latter channel is a calibrating channel separate from said flow channel.

5. The method according to claim 1, wherein the momentary velocity of the liquid flowing through said flow channel is determined in step (e) by measuring the momentary attenuation of the electromagnetic radiation at two points along said flow channel spaced a known distance from each other.

6. The method according to claim 1, further including:
   (g) measuring changes in attenuation of the electromagnetic radiation across a path which is in series with said flow channel so as to be subjected to the same temperature of the liquid in said flow channel but which path does not contain the liquid from the flow channel, and controlling in response thereto said electromagnetic radiation to which the liquid in said flow channel is exposed to compensate for temperature changes and ageing effects.

7. The method according to claim 1, wherein said electromagnetic radiation is infrared light.

8. The method according to claim 1, wherein:
   in step (a), said liquid is directed to flow through a plurality of said two channels in parallel to each other;
   in step (b), the momentary attenuation of the electromagnetic radiation is measured in each of said plurality of flow channels;
   and in step (d), the momentary volume of the liquid flowing through all said flow channels is measured to determine the momentary volume of the liquid flowing through all said flow channels.

9. The method according to claim 8, wherein in step (b), the momentary attenuation of the electromagnetic radiation measured in at least some of said flow channels is of different frequencies, to thereby provide information useful in indicating the composition of the liquid flowing through said flow channels.

10. The method according to claim 1, wherein said liquid is milk.

11. Apparatus for measuring liquid flow, comprising:
    (a) means for directing the liquid to flow through a flow channel of known dimensions;
    (b) a source of electromagnetic radiation for exposing the liquid flowing through said flow channel;
    (c) means for measuring the momentary attenuation of electromagnetic radiation by the liquid flowing through said flow channel;
    (d) means for measuring the transparency to electromagnetic radiation of the liquid flowing through said flow channel;
    (e) means for determining from said measurements the momentary volume of said liquid flowing through said flow channel;
    (f) means for determining the momentary velocity of the liquid flowing through said flow channel; and
    (g) means for determining from said means (e) and (f) the momentary flow rate of the liquid flowing through said flow channel.

12. The apparatus according to claim 11, wherein said means (d), comprising, means defining a known volume of liquid; means for exposing said known volume to said electromagnetic radiation; and means for measuring the attenuation of said electromagnetic radiation by said known volume.

13. The apparatus according to claim 12, wherein said means defining a known volume of said liquid comprises a channel of known volume through which said liquid flows at the time of said transparency measurement.

14. The apparatus according to claim 13, wherein said latter channel is a calibrating channel separate from, and in series with, said flow channel.

15. The apparatus according to claim 11, wherein said means (b) and (c) comprise a source of electromagnetic radiation on one side of said flow channel to direct the radiation transversely across said flow channel, and an electromagnetic radiation detector on the other side of said flow channel in alignment with said source.

16. The apparatus according to claim 15, wherein said means (f) comprises a second source and a second detector of electromagnetic radiation both spaced from said first source and detector a known distance.

17. The apparatus according to claim 11, further including:
    (h) means for measuring the changes in attenuation of the electromagnetic radiation across a path which is in series with said flow channel so as to be subjected to the same temperature of the liquid in said flow channel, but which path does not contain the liquid from the flow channel;
    (i) means for controlling the electromagnetic radiation source in response to said changes in said temperature.

18. The apparatus according to claim 11, wherein said electromagnetic radiation source is a source of infrared light.

19. The apparatus according to claim 11, wherein:

said means (a) directs the liquid to flow through a plurality of said flow channels in parallel to each other;

said means (c) measures the momentary attentuation of the electromagnetic radiation in each of said plurality of flow channels;

and said means (d) is a data processor which receives the outputs of all said flow channels as well as that of said transparency measuring means (d), and determines the momentary volume of the liquid flowing through all said flow channels.

20. The apparatus according to claim 19, wherein said means (b) and (c) includes electromagnetic radiation sources and detectors in at least some of said flow channels which are of different frequencies, to thereby provide information to the data processor useful in indicating the composition of the liquid flowing through said flow channels.

* * * * *